United States Patent
Hsu et al.

(10) Patent No.: US 6,751,093 B1
(45) Date of Patent: Jun. 15, 2004

(54) MOUNTING DEVICE ASSEMBLY FOR DATA STORAGE DEVICE

(75) Inventors: Yuan-Lin Hsu, Tu-chen (TW); Li Ping Chen, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/339,859

(22) Filed: Jan. 10, 2003

(30) Foreign Application Priority Data

Dec. 13, 2002 (TW) .......................................... 91220221

(51) Int. Cl.[7] .................................................. G06F 1/16
(52) U.S. Cl. ........................ 361/685; 361/683; 361/686
(58) Field of Search ................................ 361/683, 685, 361/686

(56) References Cited

U.S. PATENT DOCUMENTS 4,960,384 A * 10/1990 Singer et al. ................ 439/155

* cited by examiner

Primary Examiner—Darren Schuberg
Assistant Examiner—Yean-Hsi Chang
(74) Attorney, Agent, or Firm—Wei Te Chung

(57) ABSTRACT

A disk drive mounting device assembly (10) includes two fasteners (20), a drive cage (30) having a disk drive received therein, two mounting brackets (40), and a chassis (50). Each fastener is generally U-shaped. Outer and inner latches (27, 28) are formed on opposite sides of the fastener. A locating protrusion (22) and a mounting protrusion (24) extend forwardly from the fastener. A spring finger (26) extends rearwardly from a front of the fastener. The drive cage defines two mounting holes (32) in rear ends of opposite sides thereof. The mounting brackets are mounted on the chassis symmetrically opposite from each other. Each mounting bracket defines a longitudinal slideway (42), and a locking portion (46) at a rear end of the slideway. The fasteners snappingly engage in the locking portions. The inner latches of the fasteners protrude into the slideways and engage in the mounting holes of the drive cage.

19 Claims, 5 Drawing Sheets

MOUNTING DEVICE ASSEMBLY FOR DATA STORAGE DEVICE

BACKGROUND OF THE INVENTION

1. Field of the Invention

The present invention relates to a data storage device mounting assembly, and more particularly to an assembly having a mounting bracket and a fastener which can readily and firmly secure a data storage device such as a disk drive to a computer chassis.

2. Description of Related Art

In the assembly of a typical personal computer, a disk drive is secured inside a drive cage which is then mounted in a chassis of an enclosure using screws. When mounting the drive cage in the chassis, an operator needs to hold the drive cage with one hand, and operate a screwdriver to drive the screws with the other hand. This is inconvenient, and reduces the efficiency of assembly in mass production facilities.

Other kinds of disk drive mounting devices that do not need screws have been developed. A typical example is shown in China Patent No. 2457648Y. A chassis comprises a pair of slideways, and defines a tab on a front of each slideway. A slide rail is defined on each of opposite sides of a disk drive. An elastic protrusion is mounted in each slide rail, and a mounting hole is defined in the protrusion. The rails of the disk drive slide into the slideways of the chassis, and are mounted in the chassis by the tabs cooperating with the mounting holes of the protrusions. However, the structure of this mounting device is unduly complex. Extra parts need to be manufactured and used. This makes transportation and mass production of the chassis inconvenient and costly. In addition, when removing the disk drive, it is difficult to disengage the tabs of the chassis from the mounting holes of the protrusions.

SUMMARY OF THE INVENTION

Accordingly, an object of the present invention is to provide a data storage device mounting assembly which is easily assembled and disassembled.

Another object of the present invention is to provide a fastener which can securely mount a data storage device such as a disk drive on a mounting bracket.

In order to achieve the objects set out above, a disk drive mounting device assembly of the present invention includes a pair of fasteners, a drive cage, a pair of mounting brackets and a chassis. The drive cage has a disk drive received therein. Each fastener is generally U-shaped. An outer latch and an inner latch are outwardly formed from respective opposite sides of the fastener. A locating protrusion and a mounting protrusion extend forwardly from a front end of the fastener. A spring finger extends upwardly and rearwardly from an upper portion of an inner face of the front end of the fastener. The drive cage defines a pair of mounting holes in respective rear ends of opposite sides thereof. The mounting brackets are mounted on the chassis symmetrically opposite from each other. Each mounting bracket defines a longitudinal slideway at an inside thereof, and a locking portion at a rear end of the slideway. The fasteners snappingly engage in the locking portions of the mounting brackets. The inner latches of the fasteners protrude into the slideways and engage in the mounting holes of the drive cage.

Other objects, advantages and novel features of the present invention will become more apparent from the following detailed description when taken in conjunction with the accompanying drawings, in which:

DETAILED DESCRIPTION OF THE INVENTION

Figure 1:
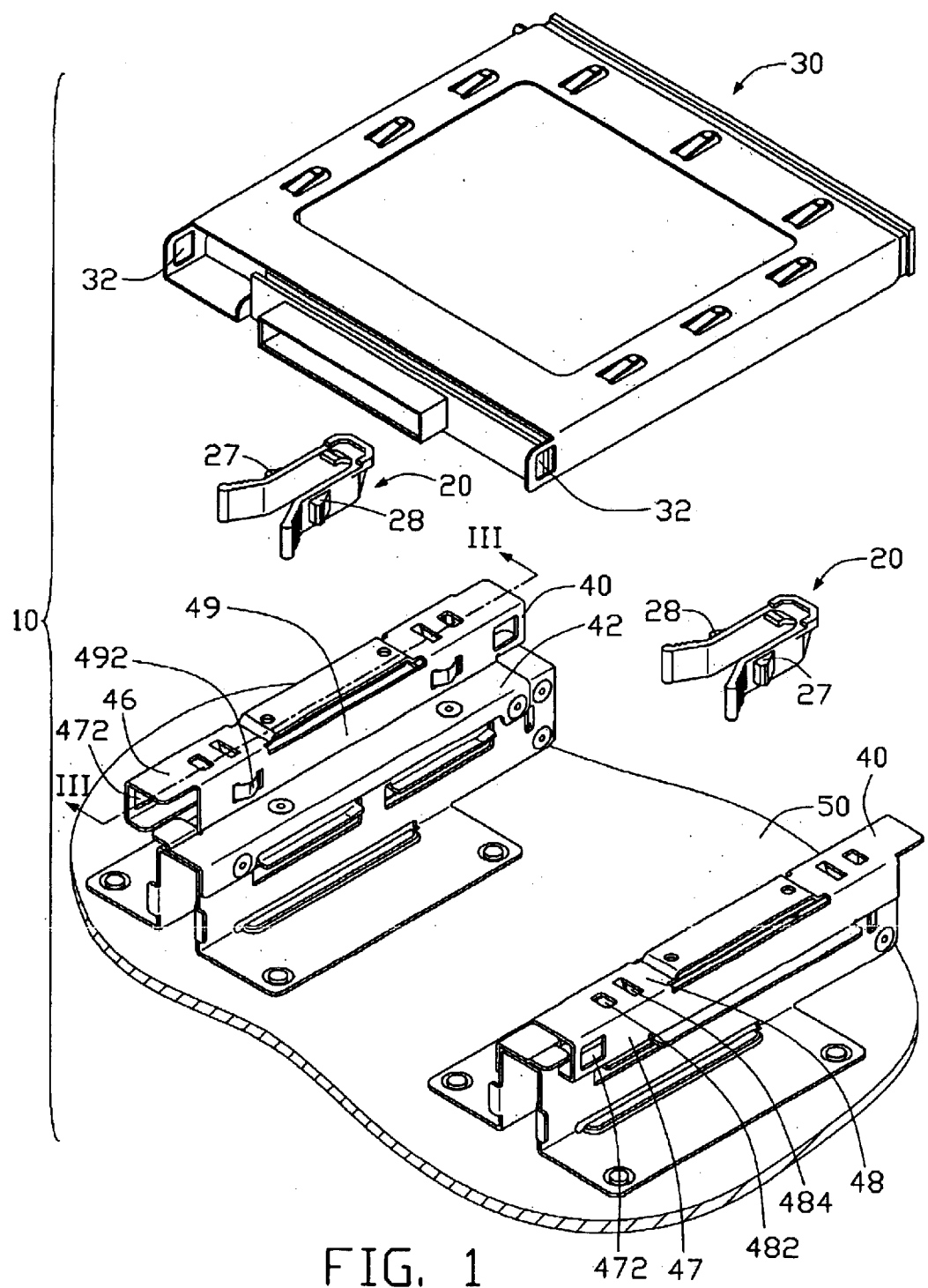
FIG. 1 is an exploded, isometric view of a disk drive mounting device assembly in accordance with the present invention.

Reference will now be made to the drawing figures to describe the preferred embodiment of the present invention in detail.

Figure 2:
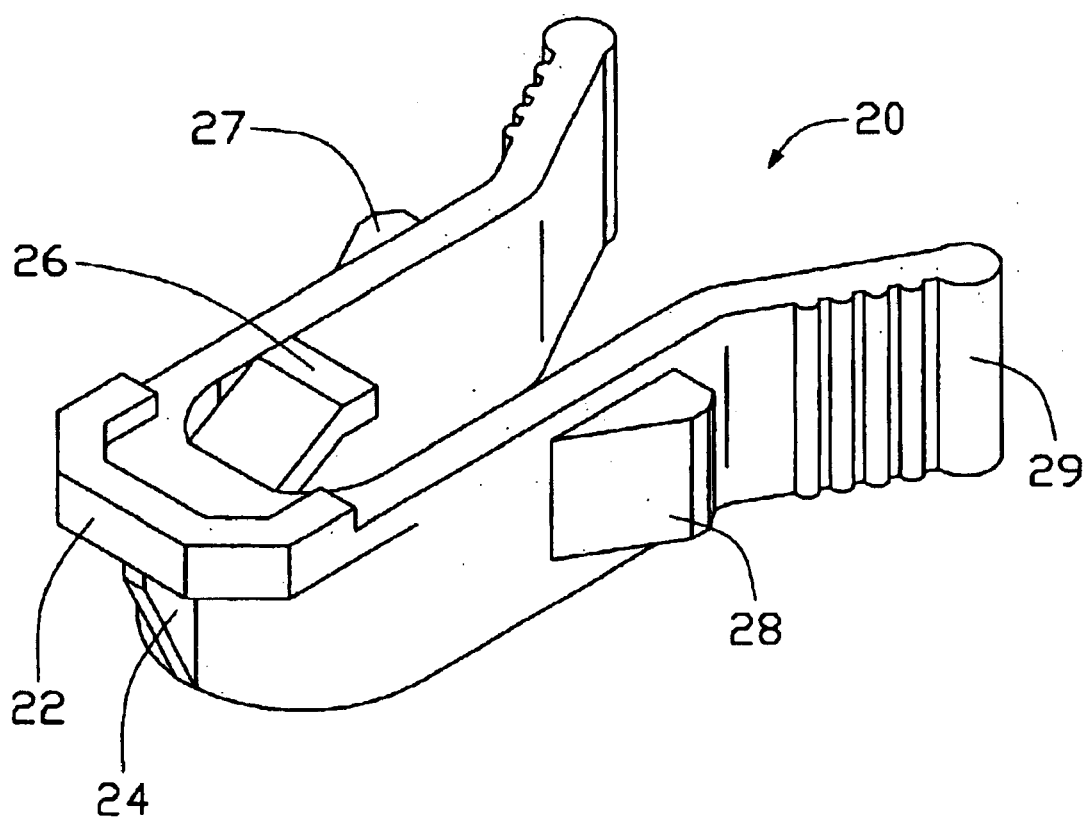
FIG. 2 is an enlarged, isometric view of one fastener of the disk drive mounting device assembly of FIG. 1, but viewed from another aspect.
Figure 3:
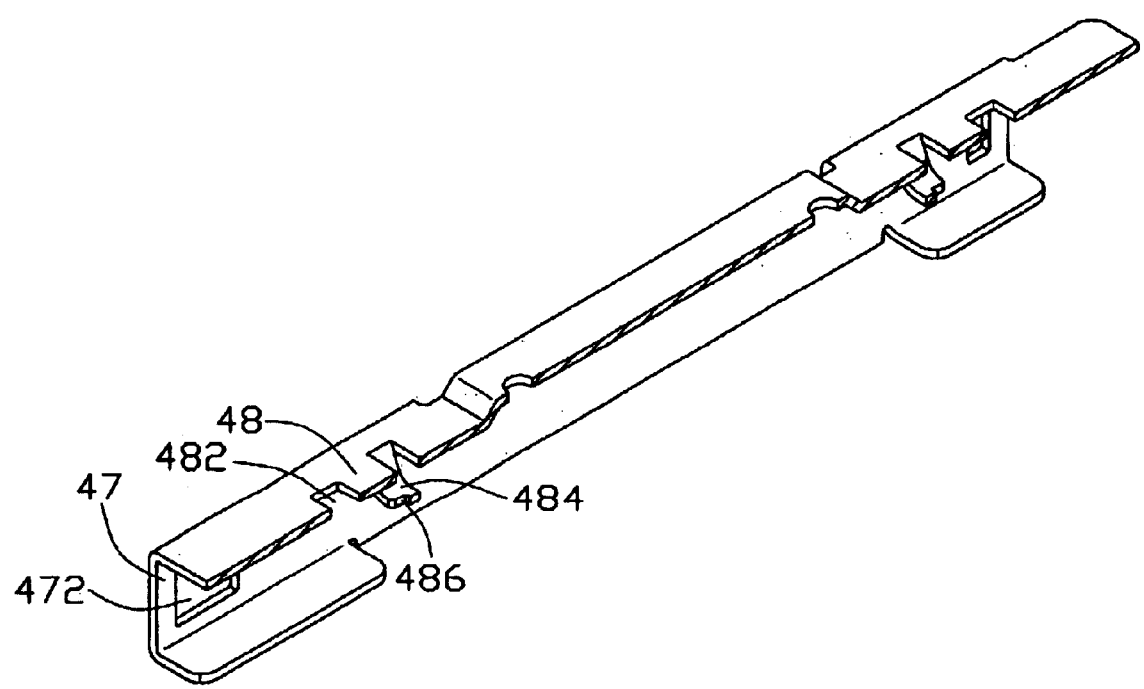
FIG. 3 is a cross-sectional view taken along line III—III of FIG. 1.

As shown in FIGS. 1–3, a disk drive mounting device assembly 10 in accordance with a preferred embodiment of the present invention includes a pair of fasteners 20, a drive cage 30, a pair of mounting brackets 40 and a chassis 50. The drive cage 30 has a data storage device such as a disk drive received therein. Each fastener 20 is generally U-shaped. A locating protrusion 22 extends forwardly from a front end of the fastener 20. A mounting protrusion 24 is formed forwardly from the front end of the fastener 20 below the locating protrusion 22. A spring finger 26 extends upwardly and rearwardly from an upper portion of an inner face of the front end of the fastener 20. An outer latch 27 and an inner latch 28 are outwardly formed from respective opposite side plates (not labeled) of the fastener 20. Two handles 29 extend rearwardly and outwardly from free ends of the respective side plates of the fastener 20. The handles 29 gradually diverge away from each other.

The drive cage 30 defines a pair of first mounting holes 32 in respective rear ends of opposite sides thereof. The mounting brackets 40 are mounted on the chassis 50 symmetrically opposite from each other. Each mounting bracket 40 defines a longitudinal slideway 42 at an inside thereof, and a locking portion 46 at a rear end of the slideway 42. The drive cage 30 can slide on the slideways 42 of the mounting brackets 40. A hollow tubular structure is formed from an outside edge of each slideway 42. The hollow tubular structure comprises an outer side plate 47, a top plate 48, and an inner side plate 49. A cross-section of the tubular structure is rectangular. A rear end of the hollow tubular structure defines a locking portion 46. A second mounting hole 472 is defined in the outer side plate 47 at the locking portion 46, for engagingly receiving the latch 27 of a corresponding fastener 20. A cutout (not labeled) is defined in the inner side plate 49 at the locking portion 46 opposite from the second mounting hole 472, for extension therethrough of the inner latch 28 of the corresponding fastener 20. A pair of spaced elastic protrusions 492 protrudes inwardly from the inner side plate 49 into the slideway 42. A third mounting hole 482 is defined in the top plate 48 at the locking portion 46, for engagingly receiving the spring finger 26 of the corresponding fastener 20. A locating plate 484 is downwardly stamped from the top plate 48, thus defining a through aperture (not labeled) for engagingly receiving the locating protrusion 22 of the corresponding fastener 20. A groove 486 is defined in a rear edge of a middle portion of the locating plate 484, for engagingly receiving the mounting protrusion 24 of the corresponding fastener 20.

Figure 4:
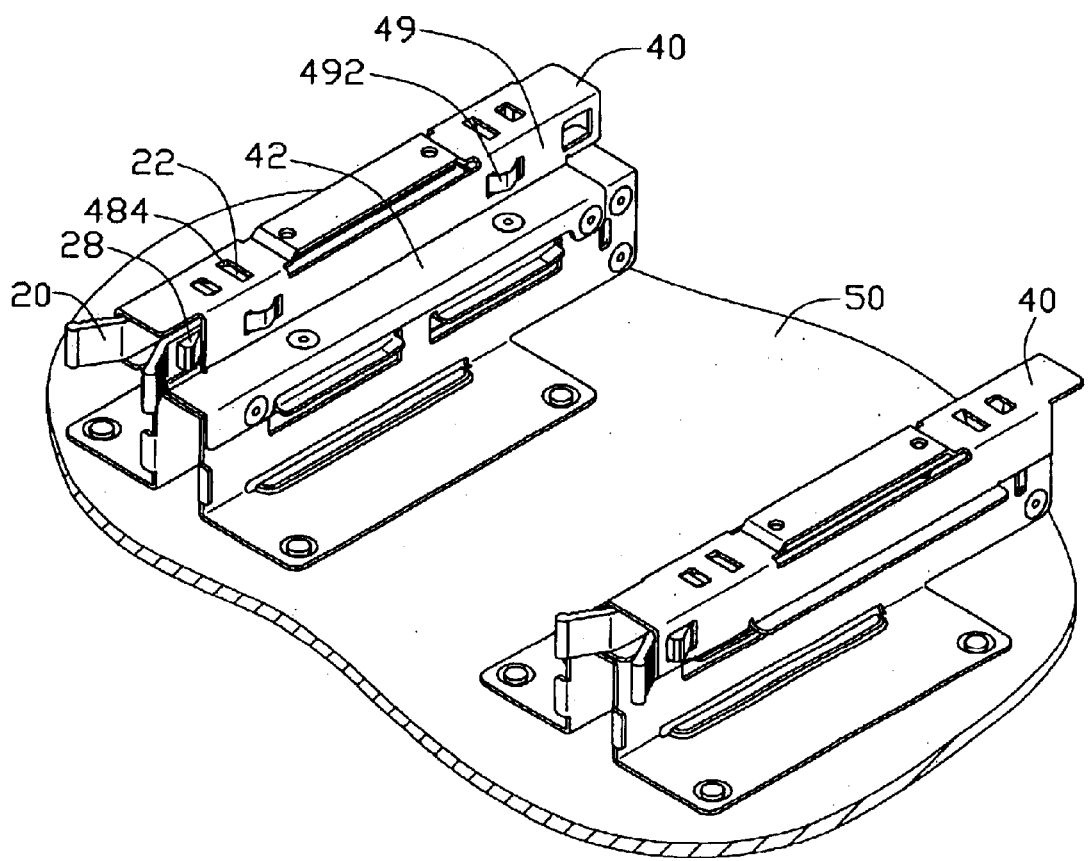
FIG. 4 is an assembled view of FIG. 1, but without showing a drive cage having a disk drive therein.
Figure 5:
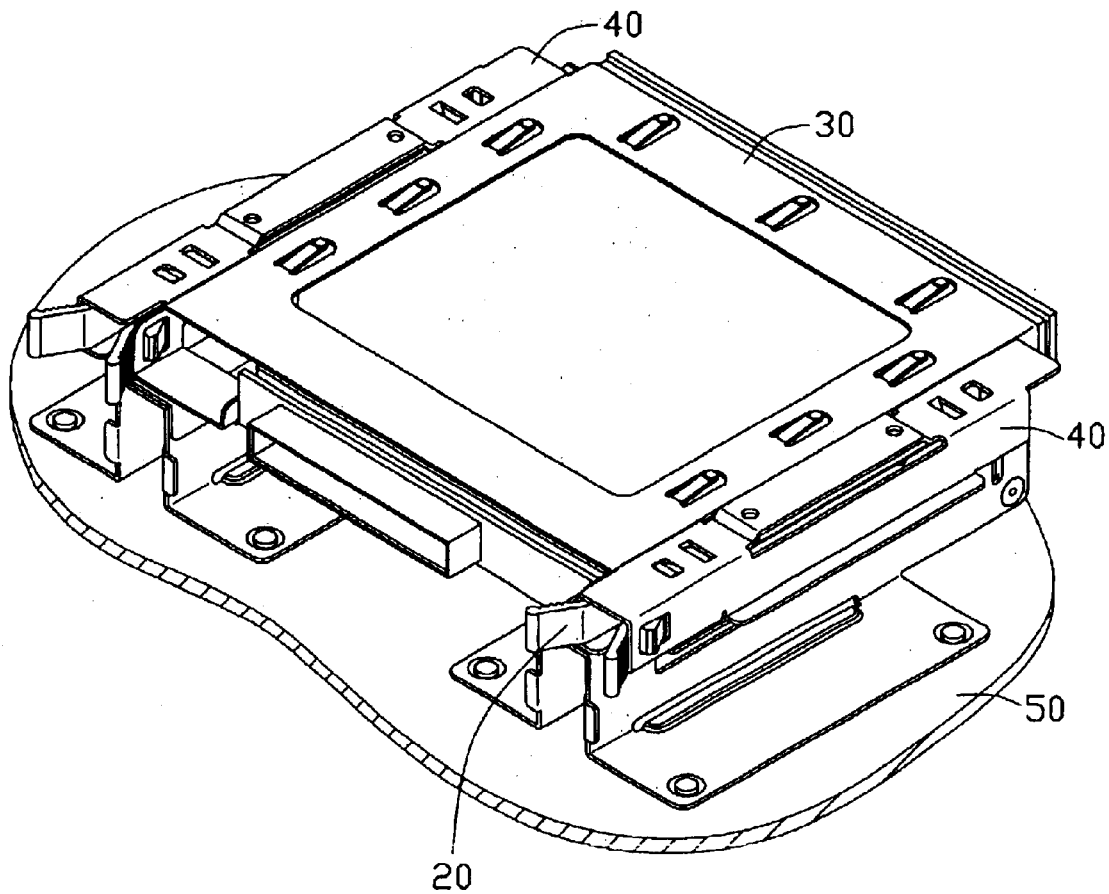
FIG. 5 is an assembled view of FIG. 1.

Referring also to FIGS. 4 and 5, in assembly, the fasteners 20 are mounted into the locking portions 46. The outer latches 27 are snappingly received in the second mounting holes 472 of the outer side plates 47, and the inner latches 28 protrude through the cutouts into the slideways 42. The spring fingers 26 are snappingly received in the third mounting holes 482 of the top plates 48. The locating protrusions 22 are engagingly received in the through apertures at the top plates 48. The mounting protrusions 24 are engagingly received in the grooves 486 of the locating plates 484.

The drive cage 30 with the disk drive is put on front portions of the slideways 42, and is slid rearwardly along the slideways 42 until the inner latches 28 of the fasteners 20 snappingly engage in the first mounting holes 32 of the drive cage 30. The elastic protrusions 492 of the slideways 42 resiliently abut against sides of the drive cage 30. Thus the drive cage 30 with the disk drive is securely mounted in the mounting bracket 40. The spring fingers 26 and the latches 27,28 prevent the fasteners 20 from accidentally sliding out of the locking portions 46. The mounting protrusions 24 prevent the fasteners 20 from being displaced in transverse directions.

In disassembly, the handles 29 of each fastener 20 are squeezed toward each other, so that the inner latches 28 of the fasteners 20 are released from the first mounting holes 32. The drive cage 30 is then easily withdrawn from the slideways 42. When removing each fastener 20 from its locking portion 46, the spring finger 26 is pushed down so that it is released from the third mounting hole 482 of the top plate 48. Simultaneously, the handles 29 are squeezed toward each other so that the outer latch 27 is released from the second mounting hole 472 of the outer side plate 47. The fastener 20 is then easily withdrawn from the locking portion 46.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting assembly, comprising:
    a mounting bracket comprising a slideway and a locking portion arranged at an end of the slideway;
    a fastener mounted in the locking portion of the mounting bracket, the fastener comprising a first latch protruding into the slideway, wherein the fastener is generally U-shaped and comprises inner and outer side plates, and the first latch is formed inwardly from the inner side plate;
    a cage defining a first mounting hole at an end thereof; and
    a data storage device mounted in the cage;
    wherein the combined cage and data storage device is slidable on the slideway of the mounting bracket until the first latch engages in the first mounting hole of the drive cage to securely mount the data storage device on the mounting bracket.

2. The mounting assembly as recited in claim 1 wherein a pair of handles is provided at respective free ends of the side plates.

3. The mounting assembly as recited in claim 1, wherein the locking portion is substantially a hollow cylinder and comprises a first plate, a second plate and a third plate, the second plate connecting the first plate and the third plate, the third plate extending from the slideway.

4. The mounting assembly as recited in claim 3, wherein a second mounting hole is defined in the first plate of the locking portion, and a second latch is formed on the outer side plate of the fastener, the second latch engaging in the second mounting hole.

5. The mounting assembly as recited in claim 3, wherein a third mounting hole is defined in the second plate of the locking portion, and a spring finger extends rearwardly and upwardly from a front end of the fastener, the spring finger elastically engaging in the third mounting hole.

6. The mounting assembly as recited in claim 3, wherein a locating plate is downwardly formed from the second plate into the locking portion thereby defining a through aperture between the second plate and the locating plate, and a locating proton extends forwardly from a front end of the fastener, the locating protrusion being engagingly received in the through aperture.

7. The mounting assembly as recited in claim 6, wherein a slot is defined in the locating plate, and a mounting protrusion extends forwardly from the front end of the fastener under the locating protrusion, the mounting protrusion being engagingly received in the slot.

8. The mounting assembly as recited in claim 3, wherein at least one elastic protrusion protrudes from the third plate into the slideway.

9. The mounting assembly as recited in claim 3, wherein a cutout is defined in the third plate of the locking portion adjacent the first mounting hole of the cage.

10. A mounting device for mounting a combined drive cage and disk drive therein, the drive cage defining a mounting hole in a side thereof, the mounting device casing:
    a mounting bracket comprising a slideway for slidingly supporting the combined drive cage and disk drive thereon, and a locking portion provided at an end of the slideway; and
    a fastener mounted in the locking portion of the mounting bracket, the fastener comprising a first latch protruding into the slideway for engaging in the mounting hole of the drive cage, wherein the fastener is generally U-shaped and comprises inner and outer side plates, and the first latch is formed inwardly from the inner side plate.

11. The mounting device as recited in claim 10, wherein the locking portion is substantially a hollow cylinder and comprises a first plate, a second plate and a third plate, the second plate connecting the first plate and the third plate, the third plate extending from the slideway.

12. The mounting device as recited in claim 11, wherein a mounting hole is defined in the first plate of the locking portion, and a second latch is formed on the outer side plate of the fastener, the second latch engaging in the mounting hole of the first plate.

13. The mounting device as recited in claim 11, wherein a mounting hole is defined in the second plate of the locking portion, and a spring finger extends rearwardly and upwardly from a front end of the fastener, the spring finger elastically engaging in the mounting hole of in the second plate.

14. The mounting device as recited in claim 11, wherein a locating plate is downwardly formed from the second plate into the locking portion thereby defining a through aperture between the second plate and the locating plate, and a locating protrusion extends forwardly from a front end of the fastener, the locating protrusion being engagingly received in the through aperture.

15. The mounting device as recited in claim 14, wherein a slot is defined in the locating plate, and a mounting protrusion extends forwardly from the front end of the fastener under the locating protrusion, the mounting protrusion being engagingly received in the slot.

16. The mounting device as recited in claim 11, wherein at least one elastic protrusion protrudes from the third plate into the slideway.

17. A mounting device assembly comprising:

a mounting bracket defining at least one slideway, along a front-to-back direction, with one locking portion at a front end thereof;

said locking portion including a top plate with a locating plate stamped therefrom, two opposite ends of the locating plate joined with the top plate, the locating plate cooperating with said top plate defining a through aperture in said front-to-back direction;

a groove formed in a front edge of said locating plate; and a fastener mounted in said locking portion, an innermost portion of said fastener including a horizontal locating protrusion received in the through aperture for restricting vertical movement of said fastener in the locking portion, and a vertical mounting protrusion, adjacent to said horizontal locating protrusion, received in the groove for restricting at least lateral movement of the fastener in the locking portion; wherein said fastener includes a deflectable latch arm on an outermost porting to latchably engage a data storage device.

18. The assembly as recited in claim 17, wherein said fastener further includes another deflectable latch arm on said outermost portion to latchably engage the locking portion.

19. The assembly as recited in claim 18, wherein said fastener defines a U-shaped configuration with a bight connected between said two deflectable latch arms, and said horizontal locating protrusion and said vertical mounting protrusion are located on said bight.

* * * * *